April 22, 1930.   W. PALMER   1,755,610
FOAM GENERATOR
Filed Jan. 20, 1927   2 Sheets-Sheet 1

INVENTOR
Walter Palmer
BY
Pennie Davis Marvin & Edmonds
ATTORNEYS

April 22, 1930.  W. PALMER  1,755,610
FOAM GENERATOR
Filed Jan. 20, 1927  2 Sheets-Sheet 2

INVENTOR
Walter Palmer
BY
ATTORNEY

Patented Apr. 22, 1930

1,755,610

UNITED STATES PATENT OFFICE

WALTER PALMER, OF CHESTER, PENNSYLVANIA, ASSIGNOR TO AMDYCO CORPORATION, OF NEW YORK, N. Y., A CORPORATION OF NEW YORK

FOAM GENERATOR

Application filed January 20, 1927. Serial No. 162,340.

This invention relates to fire protection, and particularly to an apparatus for producing fire-extinguishing foam by combining solid materials containing the necessary reacting ingredients with a stream of water.

I have heretofore described in Letters Patent No. 1,591,401 a method of and apparatus for producing fire-extinguishing foam in which the solid materials are introduced to the stream of water with the aid of suction and the present invention involves an improvement in the previously described apparatus.

The dry materials employed in producing foam may consist, for example, of sodium bicarbonate and aluminum sulphate combined in the proper proportions to react in the presence of water and thereby produce a gas. To these ingredients should be added a stabilizer such as an extract of licorice root or of oak bark or other material having the property of increasing the surface tension of the bubbles formed when the gas is released so that the foam will have lasting qualities. The dry composition as described may be stored in suitable receptacles and introduced to the apparatus when the foam is required, a stream of water under suitable pressure being supplied coincidently to effect the combination and chemical reaction between the ingredients. Foam can be produced continuously in the manner described so long as the dry composition is supplied to the apparatus and water is permitted to flow therethrough.

It is the object of the present invention to provide an improved apparatus permitting relative adjustment of the parts which effect the combination of the dry composition with the water in order to vary the consistency of the foam produced and to permit when desired the discharge of a stream of water in place of the foam.

Another object of the invention is to provide a structure in which the mixing nozzles can be removed and replaced readily.

Figure 1:
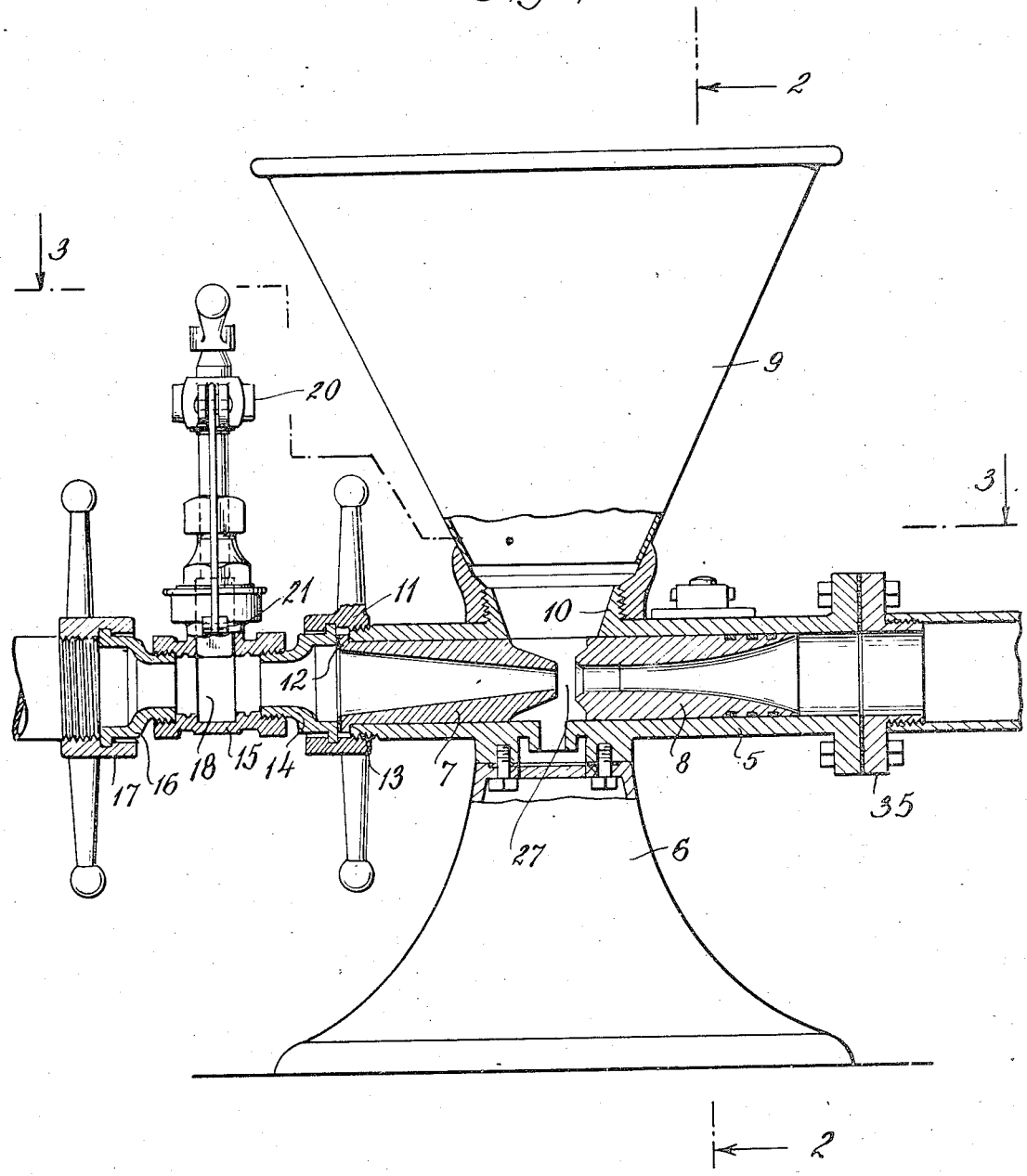
Figure 2:
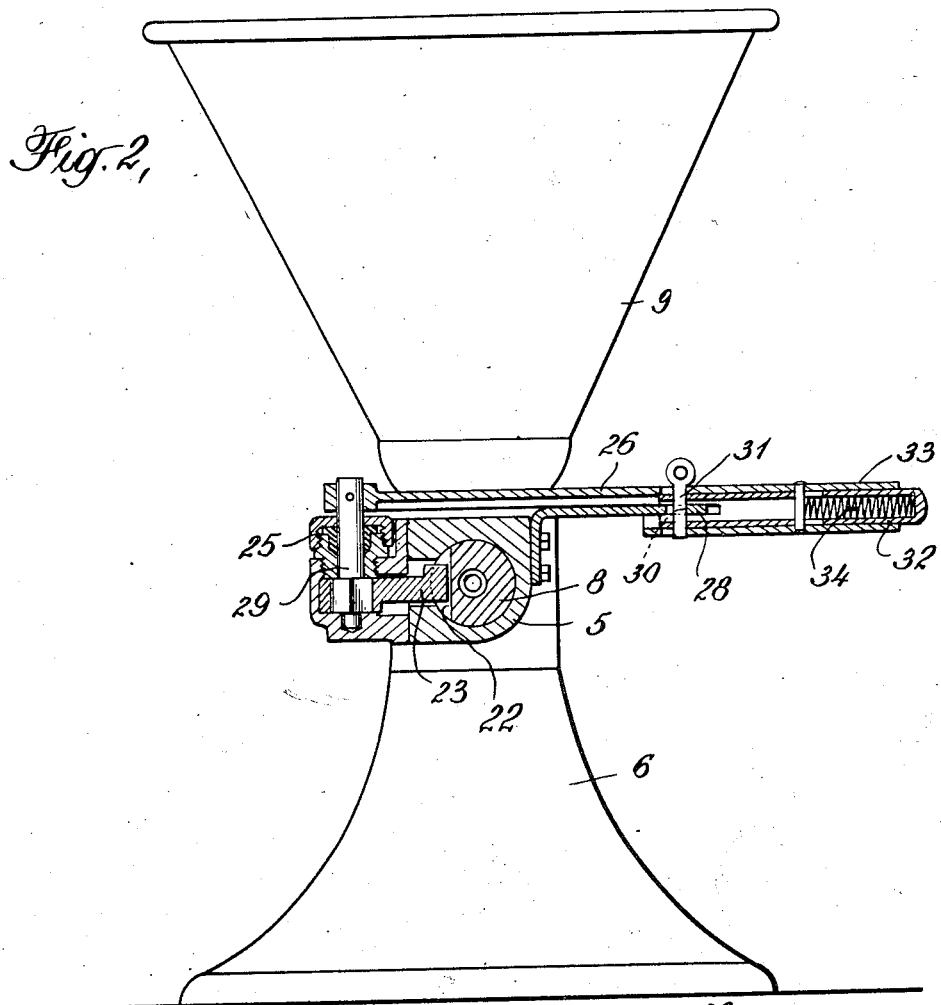
Figure 3:
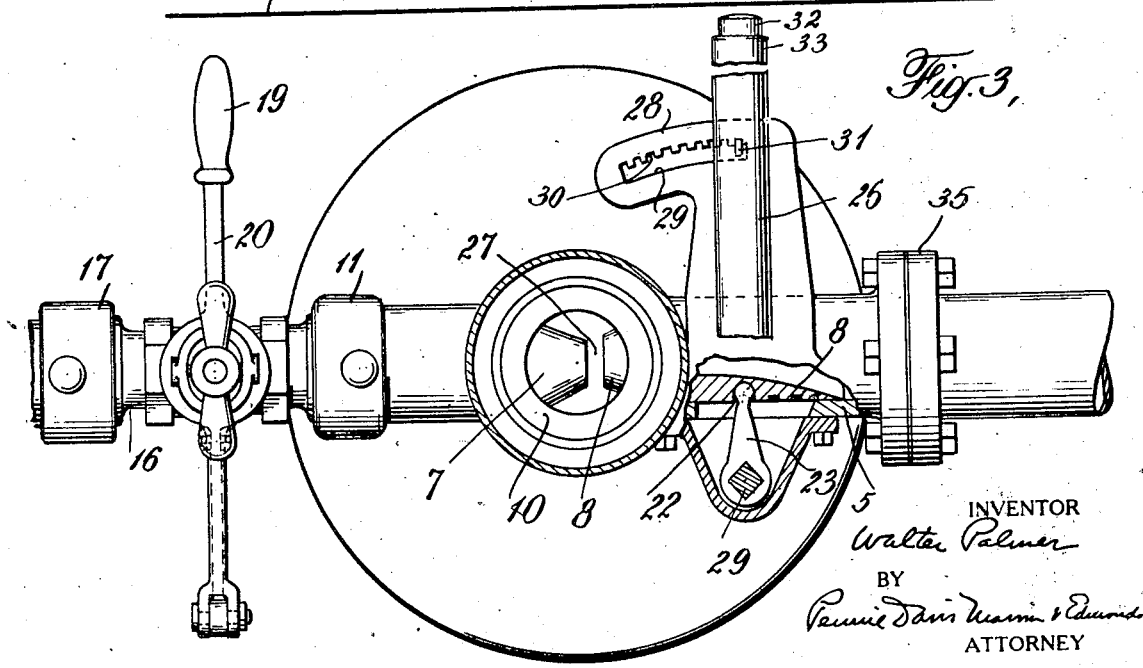

Further objects and advantages of the invention will be apparent as it is better understood by reference to the following specification and accompanying drawing, in which Fig. 1 is a longitudinal section through the apparatus embodying the invention, Fig. 2 is a section on the line 2—2 of Fig. 1; and Fig. 3 is a plan view, partially in section, illustrating details of the apparatus.

In the preferred form of the apparatus as illustrated a cylindrical housing 5 is supported upon a rigid base 6 and encloses an ejector nozzle 7 and a mixing nozzle 8, both fitting closely within the housing and being adapted to be removed therefrom for adjustment or replacement in the manner hereinafter described. A hopper 9 is threadedly secured to a flange 10 on the housing 5 surrounding an orifice leading to the mixing chamber within the housing. The hopper is adapted to receive the dry composition and to permit the feeding thereof to the stream of water for the production of foam.

The ejector nozzle 7 is held within the housing by a coupling 11 threaded thereon and is provided with a flange 12 bearing against a shoulder 13 on the housing to fix the position of the nozzle relatively to the housing. A nipple 14 forming a part of the coupling is threadedly connected to a valve casing 15. A similar nipple 16 at the opposite side of the valve casing 15 forms part of a coupling 17 to permit the connection of a hose (not shown) which conveys water from a suitable source to the apparatus. A gate valve 18 is disposed within the valve casing 15 and is controlled by an operating handle 19 on a lever 20 which is pivoted on the valve housing 15 and connected to the valve stem 21. The valve permits control of the supply of water to the apparatus.

The mixing nozzle 8 is slidably disposed within the housing 5 and is provided with a recess 22 to receive the end of a finger 23 mounted on a pintle 29 which extends through a stuffing box 25 and is engaged exteriorly of the housing 8 by a lever 26. By swinging the lever the mixing nozzle 8 can be adjusted relatively to the end of the ejector nozzle 7 and can be brought into close engagement with the latter so as to permit the passage of water directly through the apparatus without producing any suction effect in the chamber 27 which surrounds the abutting ends of the two nozzles. By adjusting the lever 26 the mixing nozzle 8 may be moved away from the end of the ejector nozzle 7 to vary the suction effect in the chamber 27 and consequently the proportion of the dry material which is drawn into the chamber and mingled with the stream of water. This permits the production of foam of varying consistencies from a relatively sloppy foam to one which is quite stiff and free from uncombined water.

The lever 26 is held in adjusted position by means of a sector 28 mounted on the housing 5 and having a slot 29' therein with notches 30 at one side thereof. A pin 31 is loosely supported in the lever 26 and is adapted to be held in one or the other of the notches 31 by a sleeve 32 which is slidably supported within a handle 33 on the lever 26 and resiliently biased by a spring 34 in the proper direction to maintain engagement between the pin 31 and the selected notch. By moving the sleeve 32 inwardly the pin can be disengaged from the notch and the lever 26 can then be adjusted to vary the relative positions of the nozzles 7 and 8 for the purpose hereinbefore mentioned. When the sleeve 32 is released the lever will be locked in the adjusted position.

The pin 31 is loosely mounted in the lever 26 so that it can be withdrawn and when it is withdrawn the lever is freed from the sector and can be swung to a position in which the finger is freed from the recess 22 in the mixing nozzle 8. When the mixing nozzle is thus released it can be withdrawn freely from the housing 5 for repair or replacement. The end of the housing 5 through which the mixing nozzle 8 is withdrawn is provided preferably with a flanged and threaded connection 35 for the hose (not shown) through which the foam produced in the apparatus is ejected.

It is to be understood that the nozzles 7 and 8 are designed so that, when properly adjusted, they will afford, when the stream of water under suitable pressure is introduced to the apparatus, the suction required to draw the solid composition into the stream for the purpose of producing foam. The adjustment of the mixing nozzle 8 as hereinbefore described permits compensation for variations in the pressure of the water available as well as the variation of the consistency of the foam produced. Among the other advantages of the apparatus are the facility with which the nozzles can be removed and replaced and the possibility of applying a stream of water when desired in place of the foam. The apparatus also permits the rapid adjustment in the event that the foam works into the hopper. In such a case the suction can be varied quickly or cut off completely until the obstruction caused by the foam is cleared from the hopper.

Various changes can be made in the details of construction of the apparatus as described without departing from the invention or sacrificing the advantages enumerated or other advantages resulting from the structure as described.

I claim:—

1. In an apparatus for producing fire-extinguishing foam, a hopper adapted to receive a dry material containing foam-forming and stabilizing ingredients, a housing communicating with the hopper, ejector and mixing nozzles within the housing, a lever projecting through the housing and having a finger engaging with a recess in one of the nozzles whereby the latter can be moved relatively to the other nozzle, and means for holding the lever in adjusted position and limiting the arcual extent of movement thereof including a notched sector and a pin on the lever adapted to engage the notches of the sector, the pin being removable whereby the lever can be moved to disengage the finger from the recess in the nozzle to permit removal of the latter from the housing.

2. In an apparatus for producing fire-extinguishing foam, a hopper adapted to receive a dry material containing foam-forming and stabilizing ingredients, a housing communicating with the hopper, ejector and mixing nozzles within the housing, a lever projecting through the housing and having a finger engaging with a recess in one of the nozzles whereby the latter can be moved relatively to the other nozzle, and means for holding the lever in adjusted position and limiting the arcual extent of movement thereof including removable means whereby the lever can be moved to disengage the finger from the recess in the nozzle to permit removal of the latter from the housing.

In testimony whereof I affix my signature.

WALTER PALMER.